United States Patent
Gao et al.

(10) Patent No.: US 10,313,105 B2
(45) Date of Patent: Jun. 4, 2019

(54) FRACTIONAL-N PLL BASED CLOCK RECOVERY FOR SERDES

(71) Applicant: Credo Technology Group Ltd, Grand Cayman (KY)

(72) Inventors: Xiang Gao, Fremont, CA (US); Haoli Qian, Fremont, CA (US)

(73) Assignee: Credo Technology Group Limited, Grand Cayman (KY)

( * ) Notice: Subject to any disclaimer, the term of this patent is extended or adjusted under 35 U.S.C. 154(b) by 0 days.

(21) Appl. No.: 15/702,715

(22) Filed: Sep. 12, 2017

(65) Prior Publication Data

US 2019/0081772 A1 Mar. 14, 2019

(51) Int. Cl.
*H04L 7/033* (2006.01)
*H04L 27/148* (2006.01)

(52) U.S. Cl.
CPC .......... *H04L 7/0331* (2013.01); *H04L 27/148* (2013.01)

(58) Field of Classification Search
CPC ......... H03L 7/091; H03L 7/18; H03L 7/0814; H03L 7/081; H04L 7/0331; H04L 27/148
See application file for complete search history.

(56) References Cited

U.S. PATENT DOCUMENTS

| | | | |
|---|---|---|---|
| 4,686,488 A | 8/1987 | Attenborough | |
| 5,768,268 A | 6/1998 | Kline et al. | |
| 6,678,842 B1 | 1/2004 | Shaffer et al. | |
| 7,058,150 B2 | 6/2006 | Buchwald et al. | |
| 7,151,430 B2 | 12/2006 | Mattsson | |
| 8,183,971 B2 | 5/2012 | LeGuillou et al. | |
| 8,841,983 B2 | 9/2014 | Newton et al. | |
| 9,177,709 B2 | 11/2015 | Parthasarathy et al. | |
| 9,385,859 B2 | 7/2016 | Kuan et al. | |

(Continued)

FOREIGN PATENT DOCUMENTS

CN 104584152 A 4/2015

OTHER PUBLICATIONS

International Search Report and Written Opinion dated Jan. 11, 2018, in PCT/CN17/79880.

(Continued)

*Primary Examiner* — Sung S Ahn
(74) *Attorney, Agent, or Firm* — Ramey & Schwaller, LLP; Daniel J. Krueger

(57) ABSTRACT

An illustrative digital communications receiver and a fractional-N phase lock loop based clock recovery method provide substantially reduced sensitivity to nonlinearities in any included phase interpolators. One receiver embodiment includes: a fractional-N phase lock loop, a phase interpolator, a sampling element, a phase detector, a phase control filter, and a frequency control filter. The phase interpolator applies a controllable phase shift to the clock signal from the frac-N PLL to provide a sampling signal to the sampling element. The phase detector estimates timing error of the sampling signal relative to the analog receive signal. The phase control filter derives a phase control signal for the phase interpolator which operates to minimize a phase component of the estimated timing error. The frequency control filter derives the frequency control signal in a fashion that separately minimizes a frequency offset component of the estimated timing error, reducing the interpolator's phase rotation rate.

20 Claims, 2 Drawing Sheets

(56) References Cited

U.S. PATENT DOCUMENTS

| | | | |
|---|---|---|---|
| 2007/0246805 A1 | 10/2007 | Ligang et al. | |
| 2007/0285177 A1* | 12/2007 | Werker | H03L 7/091 331/16 |
| 2012/0044034 A1 | 2/2012 | Nazarian et al. | |
| 2013/0149995 A1 | 6/2013 | Guionnet | |
| 2013/0216014 A1* | 8/2013 | Kong | H03L 7/07 375/376 |
| 2015/0003505 A1 | 1/2015 | Lusted et al. | |
| 2016/0337114 A1 | 11/2016 | Baden et al. | |
| 2017/0180112 A1* | 6/2017 | Hsieh | H03L 7/0807 |

OTHER PUBLICATIONS

Yang, Ching-Yuan; A High-Frequency CMOS Multi-Modulus Divider for PLL Frequency Synthesizers; Analog Integr Circ Sig Process; 2008; pp. 155-162; vol. 55; Springer Science+Business Media, LLC.
Non-Final Office Action dated Jan. 24, 2018, in U.S. Appl. No. 15/487,045.
International Search Report and Written Opinion dated May 9, 2017, in International Application No. PCT/CA16/91836.
Yang, Ching-Yuan, A high-frequency CMOS multi-modulus divider for PLL frequency synthesizers, Analog Integr Circ Sig Process, 2008, pp. 155-162, vol. 55, Spring Science+Business Media LLC.

* cited by examiner

FRACTIONAL-N PLL BASED CLOCK RECOVERY FOR SERDES

BACKGROUND

Digital communications occur between sending and receiving devices over an intermediate communications medium, e.g., a fiberoptic cable or insulated copper wire, having one or more designated communications channels, e.g., carrier wavelengths or frequency bands. Each sending device typically transmits symbols at a fixed symbol rate, while each receiving device detects a potentially corrupted sequence of symbols and attempts to reconstruct the transmitted data.

A "symbol" is a state or significant condition of the channel that persists for a fixed period of time, called a "symbol interval." A symbol may be, for example, an electrical voltage or current level, an optical power level, a phase value, or a particular frequency or wavelength. A change from one channel state to another is called a symbol transition. Each symbol may represent (i.e., encode) one or more binary bits of the data. Alternatively, the data may be represented by symbol transitions, or by sequences of two or more symbols. The simplest digital communication links use only one bit per symbol; a binary '0' is represented by one symbol (e.g., an electrical voltage or current signal within a first range), and binary '1' by another symbol (e.g., an electrical voltage or current signal within a second range).

Channel non-idealities produce dispersion which may cause each symbol to perturb its neighboring symbols, causing intersymbol interference (ISI). As the symbol rate increases, ISI can make it difficult for the receiving device to determine which symbols were sent in each interval, particularly when such ISI is combined with additive noise.

The open literature discloses many equalization and demodulation techniques for recovering digital data from the degraded receive signal even in the presence of ISI. A critical piece of such techniques is a determination of the correct sample timing, as sample timing directly affects the signal to noise ratio of the discrete samples. Strategies for detecting and tracking optimal sample times exist with varying degrees of tradeoff between simplicity and performance, but as sample rates increase well into the tens-of-gigahertz range, silicon-based CMOS circuit implementations approach the device design limits and fail to provide adequate performance for existing clock recovery solutions.

SUMMARY

Accordingly, there are disclosed herein an illustrative digital communications receiver and an illustrative fractional-N phase lock loop based clock recovery method suitable for use therein. The performance of the illustrative clock recovery method and receiver has substantially reduced sensitivity to nonlinearities in any included phase interpolators.

In a disclosed embodiment an integrated receiver circuit includes: a fractional-N phase lock loop, a phase interpolator, a sampling element, a phase detector, a phase control filter, and a frequency control filter. The fractional-N phase lock loop provides a clock signal based at least in part on a frequency control signal. The phase interpolator applies a controllable phase shift to the clock signal to provide a sampling signal. The sampling element produces a digital receive signal by sampling an analog receive signal in accordance with the sampling signal. The phase detector estimates timing error of the sampling signal relative to the analog receive signal. The phase control filter derives, from the estimated timing error, a phase control signal that is supplied to the phase interpolator and which operates to minimize a phase component of the estimated timing error. The frequency control filter derives the frequency control signal from the estimated timing error in a fashion that minimizes a frequency offset component of the estimated timing error.

An illustrative embodiment of a clock recovery method, which may be implemented in an integrated receiver circuit, includes: (a) receiving an analog receive signal; (b) sampling the analog receive signal with a sampling element to obtain a digital receive signal; (c) estimating timing error of the sampling signal relative to the analog receive signal using a phase detector; (d) filtering the estimated timing error with a phase control filter to provide a phase control signal; (e) filtering the estimated timing error with a frequency control filter to provide a frequency control signal; (f) using a fractional-N phase lock loop to generate a clock signal having a frequency controlled by the frequency control signal; (g) producing a sampling signal with a phase interpolator that adjusts a phase of the clock signal based on the phase control signal; and (h) supplying the sampling signal to the sampling element.

Each of the foregoing embodiments may be implemented individually or in combination, and may be implemented with any one or more of the following features in any suitable combination: (1) a demodulator that extracts a transmitted symbol stream from the digital receive signal. (2) an interface module that performs error correction decoding on the transmitted symbol stream. (3) the phase detector derives the estimated timing error from the digital receive signal. (4) the phase detector derives the estimated timing error by comparing the sampling signal to the analog receive signal. (5) the fractional-N phase lock loop includes: (A) a multi-modulus divider that converts the clock signal into a divided-frequency clock signal; (B) a phase-frequency detector that estimates phase error of the divided-frequency clock signal relative to a reference clock signal; (C) a loop filter that derives a filtered signal from the estimated phase error; and (D) a voltage-controlled oscillator that converts the filtered signal into said clock signal. (6) the fractional-N phase lock loop includes a delta-sigma modulator that converts the frequency control signal into a modulus selector signal for the multi-modulus divider. (7) the frequency control filter includes an integration element. (8) the phase control filter includes an integration element. (9) the analog receive signal represents a light signal intensity received via an optical fiber coupled to the receiver circuit.

Significantly, the various voltage-controlled oscillators need not be phase locked to a shared precision oscillator or otherwise provided with any interdependence in their operation. The use of independent clock recovery with decoupled inductors in such multi-channel receivers may be particularly suitable for use in demodulating multiple channels carried by a given optical fiber in a computer or communications network.

Figure 1:
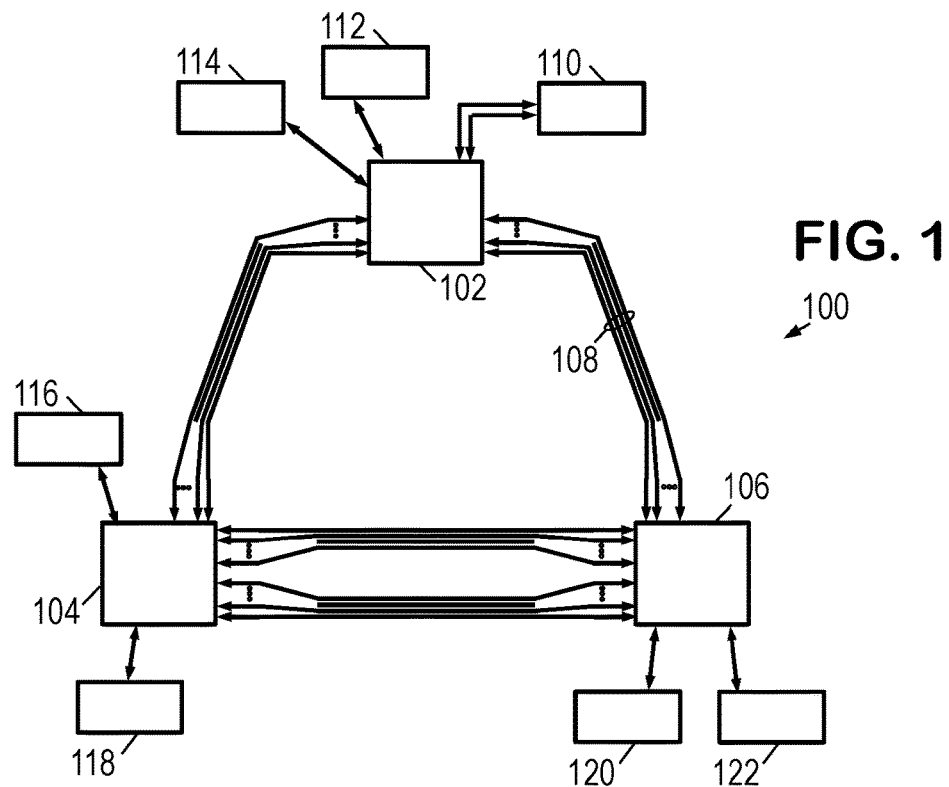
FIG. 1 shows an illustrative computer network.

It should be understood, however, that the specific embodiments given in the drawings and detailed description do not limit the disclosure. On the contrary, they provide the foundation for one of ordinary skill to discern the alternative forms, equivalents, and modifications that are encompassed in the scope of the appended claims.

DETAILED DESCRIPTION

The disclosed apparatus and methods are best understood in the context of the larger environments in which they operate. Accordingly, FIG. 1 shows an illustrative communications network 100 having communications links 108 interconnecting nodes 102, 104, 106 (representing switches, routers, base stations, gateways, and other forms of communications equipment) that direct and relay communications signals between terminal nodes 110-122 (which may represent mobile devices, portable computers, workstations, servers, network-attached storage systems, and other such communications sources and destinations). The communications network 100 may be or include, for example, the Internet, a wide area network, or a local area network.

Communication links 108 may be fiberoptic cables having bundles of optical fibers each carrying multiple modulated light signals on corresponding channels. Many fiberoptic cables have multiple bundles of optical fibers, with each fiber carrying multiple channels. With such dense packing of information signals, highly integrated communications transceivers are advantageous for efficient interfacing with communications equipment. It is desirable to combine the integrated circuits for multiple transmitter modules and multiple receiver modules on a shared monolithic semiconductor substrate, such as a segmented die of a silicon wafer. In such an environment, a single reference oscillator may be shared among multiple transmitter modules and/or multiple receiver modules.

Figure 2:
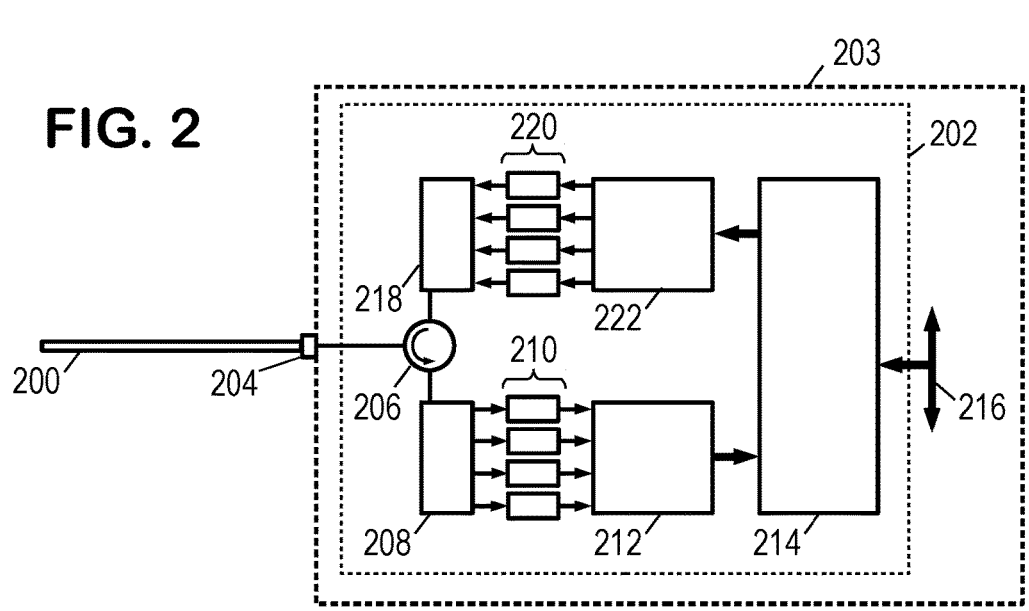
FIG. 2 is a function-block diagram of an illustrative transceiver.

FIG. 2 shows one such optical fiber 200 coupled to an illustrative transceiver 202 in a terminal node 203. (Each optical fiber in a bundle may be coupled to a different transceiver in the terminal node.) An optical connector 204 couples the fiber 200 to an optical circulator 206. The circulator 206 forwards incoming light signals to a channel splitter 208, which separates the various channels and provides one to each detector 210. The multiple detectors 210 each convert one of the light signals into an electrical receive signal. An integrated multi-channel receiver 212 operates on the electrical receive signals to extract the corresponding streams of digital data. An interface module 214 buffers the streams of digital data and converts them to a suitable format for communications of the terminal node's internal bus 216, in accordance with a standard I/O bus protocol. In some embodiments, the conversion performed by the interface module includes error correction and payload extraction.

From the internal bus 216, the interface module 214 also accepts digital data for transmission. In at least some embodiments, the interface module 214 packetizes the data with appropriate headers and end-of-frame markers, optionally adding a layer of error correction coding and/or a checksum. A multichannel transmitter 222 accepts the transmit data streams from interface module 214 and converts the digital signals into analog electrical drive signals for emitters 220, causing the emitters to generate optical signals that are coupled to a channel coupler 218. The channel coupler 218 provides them as a combined optical signal to the circulator 206, which forwards it as an outgoing signal to optical fiber 200.

Light signal modulation can be performed at extremely high symbol rates, necessitating that the receiver digitize the electrical receive signals at correspondingly high sampling rates, without sacrificing the timing precision required for maintaining an adequate signal-to-noise ratio. The same observation holds true for electrical signals over conductive channels and electromagnetic signals over wireless channels—modulation can be performed at extremely high symbol rates, necessitating that the receiver also operate at correspondingly high sampling rates while maintaining adequate timing precision to preserve the signal to noise ratio.

Commonly used in such high symbol rate systems are a pair of functional blocks known as Serializer/Deserializer blocks. Serializer blocks convert parallel data streams into (high symbol rate) serial data streams for transmission over a serial channel, while Deserializer blocks convert (high symbol rate) serial data streams received from a serial channel into parallel data streams. These conversion blocks are often referred to by the generic term "SerDes". Serializer blocks are coupled to, or may incorporate, channel-specific transmitters, while deserializer blocks are coupled to, or incorporate, channel-specific receivers.

Figure 3:
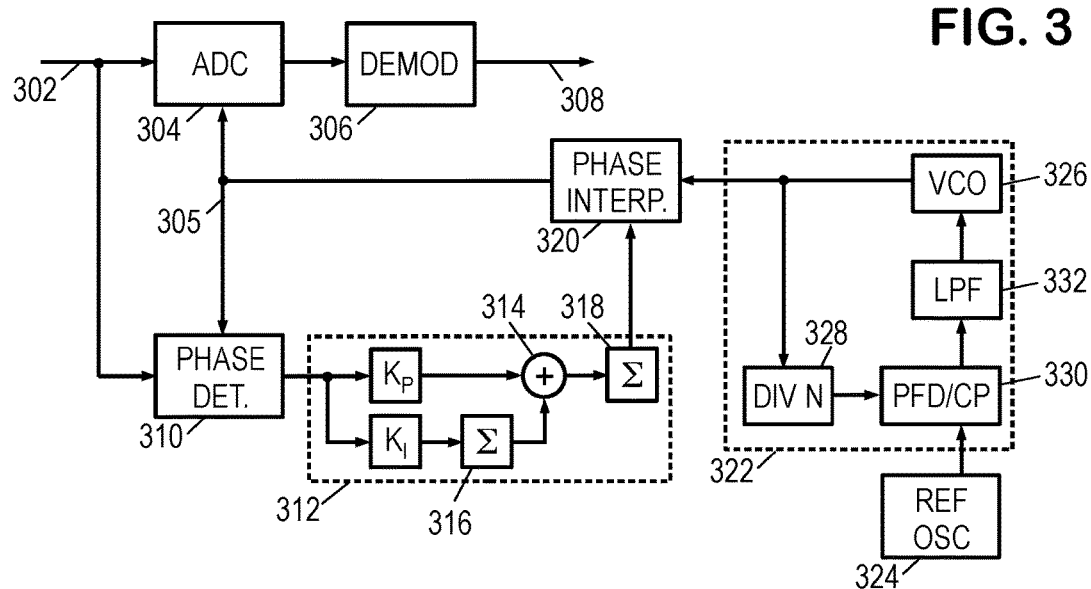
FIG. 3 is a function-block diagram of an illustrative digital communications receiver.

In most SerDes applications, high-speed serial data streams are sent without an accompanying clock signal, so the receiver derives a clock signal directly from the serial data stream. FIG. 3 shows one "clock and data recovery" technique implemented by an illustrative receiver which may be coupled to, or incorporated in, a deserializer block. A multichannel receiver 212 would include an individual receive module for each electrical receive signal 302 provided by detectors 210.

As shown in FIG. 3, each receive module includes an analog-to-digital converter 304 that samples the analog receive signal 302 at sample times corresponding to transitions in a sampling signal 305, thereby providing a digital receive signal to a demodulator 306. The demodulator 306 applies equalization and symbol detection using, e.g., a matched filter, a decision feedback equalizer, a maximum likelihood sequence estimator, or any other suitable demodulation technique. The resulting stream of demodulated symbols 308 may be supplied to the interface module 214.

To derive a suitable clock signal for sampling, the receive module employs a phase detector 310 that compares transitions in the analog receive signal to transitions in the sampling signal 305. Any suitable design may be used for phase detector 310 including, e.g., a bang-bang or proportional phase detector, which generates an estimated timing error signal. A timing loop filter 312 filters the estimated timing error signal to obtain a timing control signal for a phase interpolator 320. In the embodiment of FIG. 3, the timing loop filter 312 is a second order proportional-integration (PI) filter having a summer 314, which receives along a first path a proportional (i.e., scaled by a constant coefficient $k_P$) component of the timing error signal, and receives along a second path an integrated (i.e., scaled by a constant coefficient $k_I$ and integrated by integrator 316) component of the timing error signal. The received components are added and provided to a second integrator 318, which integrates the sum to provide the timing control signal to the phase interpolator 320.

The phase interpolator 320 also receives a clock signal from a phase lock loop (PLL) 322. The timing control signal causes the phase interpolator 320 to produce the sampling signal by adjusting the phase of the clock signal in a fashion that minimizes an expected value of the timing error. In other words, the timing control signal compensates for both the frequency offset and phase error of the clock signal relative to the analog data signal, thereby phase-aligning the sampling clock with the data symbols in the analog receive signal.

The clock signal produced by PLL 322 is a frequency-multiplied version of a reference clock signal from reference oscillator 324. A voltage controlled oscillator (VCO) 326 supplies the clock signal to both the phase interpolator 320 and to a counter 328 that divides the frequency of the clock signal by a constant modulus N. The counter supplies the divided-frequency clock signal to a phase-frequency detector (PFD) 330. PFD 330 may use a charge pump (CP) as part of determining which input (i.e., the divided-frequency clock signal or the reference clock signal) has transitions earlier or more often than the other. A low pass filter 332 filters the output of PFD 330 to provide a control voltage to VCO 326. The filter coefficients are chosen so that the divided frequency clock becomes phase aligned with the reference oscillator.

Note that for at least some contemplated uses, the reference clock used by the receiver will often drift relative to the reference clock used by the transmitter, and may differ by hundreds of ppm. In the embodiment of FIG. 3, the resulting frequency offset between the PLL's clock signal output and the analog data signal would need to be corrected by continuous phase rotation by the phase interpolator 320. This mode of operation imposes stringent demands on the linearity of the loop formed by components 310, 312, and 320, and this linearity must extend over the entire tuning range of phase interpolator 320, as the interpolator will repeatedly cycle through each of the phase interpolations during the continuous rotation.

Figure 4:
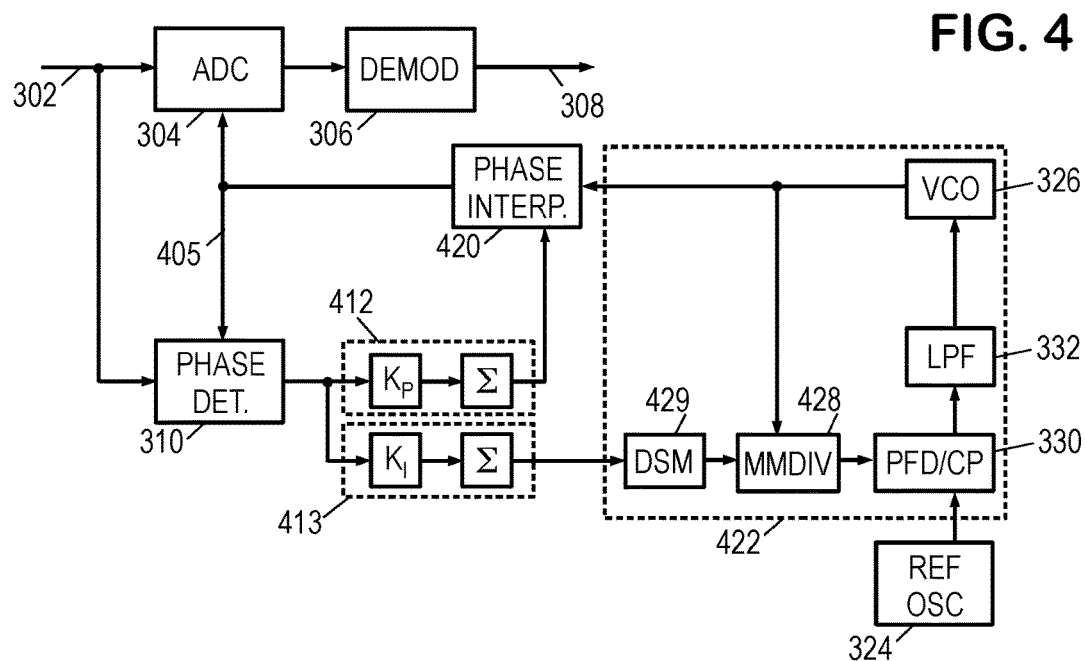
FIG. 4 is a function-block diagram of an illustrative digital communications receiver with a fractional-N phase lock loop.

FIG. 4 provides a receive module that embodies an alternative clock and data recover technique. The receive module of FIG. 4 retains the analog-to-digital converter 304 for sampling the analog receive signal 302 and providing a digital receive signal to the demodulator 306. As before, a phase detector 310 compares transitions in the analog receive signal to transitions in the sampling signal 405, but the combined phase/frequency feedback provided by timing loop filter 312 is instead provided by separate phase control and frequency control paths to correct these effects separately.

A phase control filter 412 operates on the timing error estimates to provide the phase interpolator 420 with a phase control signal that minimizes any phase error between the sampling signal and the data in the analog receive signal.

Separately, a frequency control filter 413 operates on the timing error estimates to produce a frequency control signal. In place of the phase lock loop 322 of FIG. 3, a fractional-N phase lock loop 422 converts a reference clock signal from reference oscillator 324 into a clock signal supplied to phase interpolator 420. The frequency control signal adjusts the frequency offset of the clock signal relative to the data in the analog receive signal, substantially reducing the phase rotation rate needed from the phase interpolator 420.

A comparison of FIGS. 3 & 4 shows that the phase lock loop 322 and the fractional-N phase lock loop 422 both employ a PFD/CP 330 (comparing a divided frequency clock signal to the reference clock), low pass filter 332 (filtering the error to reduce noise), and a voltage controlled oscillator 326 (supplying the output clock signal). Rather than dividing the output clock signal with a fixed modulus divider 328, the fractional-N phase lock loop 422 uses a multi-modulus divider 428 that divides by N or N+1, depending on whether the modulus selection signal is asserted at the end of (or, in alternative embodiments, at the beginning of, or at any point during) a count cycle. A delta-sigma modulator (DSM) 429 converts the frequency control signal into pulses of the modulus selection signal. The pulse density controls what fractional value between N and N+1 the divider implements, enabling very fine control of the clock frequency supplied to the interpolator 420.

The illustrated phase control filter 412 is a first order integration filter that integrates a scaled version of the estimated timing error. Similarly, the illustrated frequency control filter 413 is a first order integration filter that integrates a scaled version of the estimated timing error, albeit with a different scaling constant. Other recursive or moving-average filter implementations providing a low-pass filter response can alternatively be employed. For stability, the frequency control filter 413 may have an impulse response or time constant eight or more times longer than the impulse response or time constant of the phase control filter 412.

The embodiment of FIG. 4 employs a feedback path for frequency control of the clock signal from VCO 326, minimizing the frequency offset between the clock signal and the analog receive signal data. The frequency control feedback path is separate from the feedback path for phase control of the phase interpolator 420, largely eliminating the need for continuous rotation of the interpolated phase. Indeed, once phase lock is achieved, the rate of change for the phase interpolation drops near to zero. The linearity requirement of the phase control loop components can be relaxed, even as the phase and frequency matching performance is improved relative to existing designs.

Numerous alternative forms, equivalents, and modifications will become apparent to those skilled in the art once the above disclosure is fully appreciated. It is intended that the claims be interpreted to embrace all such alternative forms, equivalents, and modifications that are encompassed in the scope of the appended claims.

What is claimed is:

1. An integrated receiver circuit that comprises:
a fractional-N phase lock loop that provides a clock signal based at least in part on a frequency control signal;
a phase interpolator that applies a controllable phase shift to the clock signal to provide a sampling signal;
a sampling element that produces a digital receive signal by sampling an analog receive signal in accordance with the sampling signal;
a phase detector that estimates timing error of the sampling signal relative to the analog receive signal;
a phase control filter that derives, from the estimated timing error, a phase control signal supplied to the phase interpolator, wherein the phase control signal minimizes a phase component of the estimated timing error; and
a frequency control filter that derives said frequency control signal from the estimated timing error, wherein the frequency control signal minimizes a frequency offset component of the estimated timing error.

2. The receiver circuit of claim 1, further comprising a demodulator that extracts a transmitted symbol stream from the digital receive signal.

3. The receiver circuit of claim 2, further comprising an interface module that receives the transmitted symbol stream and performs error correction.

4. The receiver circuit of claim 1, wherein the phase detector derives the estimated timing error from the digital receive signal.

5. The receiver circuit of claim 1, wherein the phase detector derives the estimated timing error by comparing the sampling signal to the analog receive signal.

6. The receiver circuit of claim 1, wherein the fractional-N phase lock loop comprises:
- a multi-modulus divider that converts the clock signal into a divided-frequency clock signal;
- a phase-frequency detector that estimates phase error of the divided-frequency clock signal relative to a reference clock signal;
- a loop filter that derives a filtered signal from the estimated phase error; and
- a voltage-controlled oscillator that converts the filtered signal into said clock signal.

7. The receiver circuit of claim 6, wherein the fractional-N phase lock loop further comprises a delta-sigma modulator that converts the frequency control signal into a modulus selector signal for the multi-modulus divider.

8. The receiver circuit of claim 1, wherein the frequency control filter includes an integration element.

9. The receiver circuit of claim 8, wherein the phase control filter includes an integration element.

10. The receiver circuit of claim 1, wherein the analog receive signal represents a light signal intensity received via an optical fiber coupled to the receiver circuit.

11. A clock recovery method that comprises, in an integrated receiver circuit:
- receiving an analog receive signal;
- sampling the analog receive signal with a sampling element to obtain a digital receive signal, the sampling element sampling the analog receive signal in response to a sampling signal;
- estimating timing error of the sampling signal relative to the analog receive signal using a phase detector;
- filtering the estimated timing error with a phase control filter to provide a phase control signal;
- filtering the estimated timing error with a frequency control filter to provide a frequency control signal;
- using a fractional-N phase lock loop to generate a clock signal having a frequency controlled by the frequency control signal; and
- producing said sampling signal with a phase interpolator that adjusts a phase of the clock signal based on the phase control signal.

12. The method of claim 11, further comprising demodulating the digital receive signal to extract a transmitted symbol stream.

13. The method of claim 12, further comprising performing error correction decoding of the transmitted symbol stream.

14. The method of claim 11, wherein the phase detector derives the estimated timing error from the digital receive signal.

15. The method of claim 11, wherein the phase detector derives the estimated timing error by comparing the sampling signal to the analog receive signal.

16. The method of claim 11, wherein said generating the clock signal includes:
- converting the clock signal into a divided-frequency clock signal with a multi-modulus divider;
- estimating phase error of the divided-frequency clock signal relative to a reference clock signal using a phase-frequency detector;
- deriving a filtered signal from the estimated phase error with a loop filter; and
- converting the filtered signal into said clock signal using a voltage-controlled oscillator.

17. The method of claim 16, wherein said generating the clock signal further includes using a delta-sigma modulator to convert the frequency control signal into a modulus selector signal for the multi-modulus divider.

18. The method of claim 11, wherein the frequency control filter includes an integration element.

19. The method of claim 18, wherein the phase control filter includes an integration element.

20. The method of claim 11, wherein the analog receive signal represents a light signal intensity received via an optical fiber coupled to the integrated receiver circuit.

* * * * *